Figure 1:
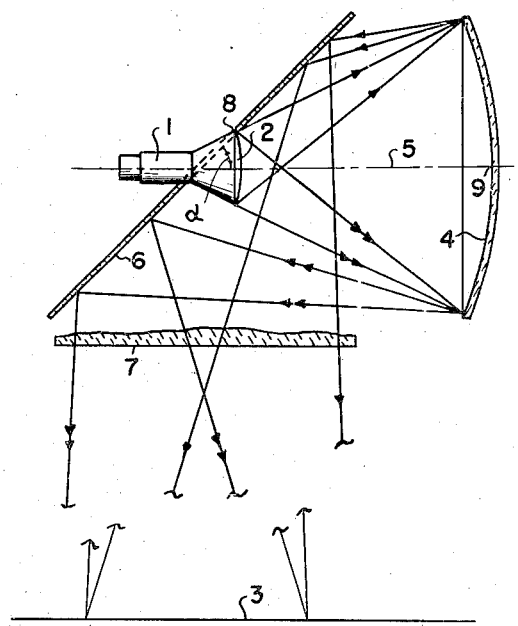

July 12, 1949.    P. M. VAN ALPHEN    2,476,124
FOLDED SCHMIDT TELEVISION PROJECTOR
Filed Jan. 15, 1946

INVENTOR
PIETER MARTINUS VAN ALPHEN
BY
ATTORNEY.

Patented July 12, 1949

2,476,124

UNITED STATES PATENT OFFICE 2,476,124

FOLDED SCHMIDT TELEVISION PROJECTOR

Pieter Martinus van Alphen, Eindhoven, Netherlands, assignor, by mesne assignments, to Hartford National Bank and Trust Company, Hartford, Conn., as trustee Application January 15, 1946, Serial No. 641,389
In the Netherlands September 30, 1940

Section 1, Public Law 690, August 8, 1946
Patent expires September 30, 1960

4 Claims. (Cl. 178—7.5)

If for the purpose of projecting the luminous image of a cathode-ray tube, for example a received television image, on an enlarged scale use is made of an objective in the form of a lens of a size such as is usual for projecting films and diapositives the drawback is experienced that only a small part of the light radiated by the image screen is used efficiently. This disadvantage may be obviated by the use of a lens of sufficiently high luminous intensity but such a lens is very costly. It is by far more advantageous to focus the luminous rays by means of one or more concave mirrors.

The invention relates to a projector for the image screen of a cathode-ray tube in which the last-mentioned method is adopted and has for its object to achieve optimum efficiency.

For the satisfactory formation of an image it is desirable that a concave mirror should be arranged in such manner that one axis of this mirror passes through the centre or approximately through the centre of the image screen to be projected. In this case the tube must, however, be arranged in the beam of reflected luminous rays and this involves important loss of light since not only the tube itself but also the appliance in which the tube is housed are placed in the luminous cones.

This disadvantage is obviated by the invention by causing the light emitted by the image screen of the cathode-ray tube to be reflected first by a concave mirror one axis of which passes through the centre or approximately the centre of the image screen of the tube and then by a second mirror which is arranged at an angle with the same axis of the concave mirror so that the concave mirror is not struck by the light reflected twice.

The second mirror has an aperture formed in it. Through this aperture the cathode-ray tube may be passed or if the tube is arranged entirely at the back of the surface of the second mirror the light that is radiated by the image screen may be transmitted through this aperture. In both cases further apparatus components remain without the projecting beam and do not cause any loss of light.

Thus only a small part of the light reflected by the concave mirror becomes still lost but a further development of the appliance according to the invention leads to limiting this loss of light to a minimum percentage. For this purpose the tube is so arranged that the image screen is situated between the two mirrors but has its edge tangent to the surface of the second mirror.

In order that the invention may be clearly understood and readily carried into effect it will now be described more fully with reference to the accompanying drawing, in which Fig. 1 diagrammatically shows one example of the arrangement of the tube and mirrors in an appliance according to the invention, whereas Figs. 2 and 2a serve to illustrate why the arrangement shown in Fig. 1 is optimum.

Referring to Fig. 1, 1 designates the cathode-ray tube whose image screen 2 is represented on a projection screen 3 by means of a concave mirror 4 which may be spherical, parabolic or curved in a different manner. The axis 5 of the mirror 4 coincides with the axis of the tube and consequently passes through the centre of the screen 2. At the back of the screen 2 a mirror 6 is arranged at an angle $\alpha$ with the axis 5. The second mirror is shown to be plane but if desired use may also be made of a mirror having a curved surface. The angle $\alpha$ is chosen to be so large that the light reflected by the mirror 6 does not impinge on the mirror 4. This angle should not be too small in order that defects in the reflection may be avoided as far as possible and the necessary size of the mirror surface may be limited. In the form of construction shown the angle is 45°.

When using a spherical mirror 4 it is advantageous that the tube 1 should have a spherical fluorescent screen having such a curvature radius as to be concentric with the mirror 4. Thus, a substantially plane image is obtained.

For the purpose of suppressing spherical aberration and other optical troubles occurring in projection the surface of the mirror 6 may be curved in such manner that the disabilities from which the mirror 4 suffers are eliminated wholly or in part by the mirror 6. As an alternative in the path of the luminous rays reflected by the mirror 6 an optical correction-member may be arranged in the form of a transparent plate a sectional view of which is diagrammatically shown in Fig. 1 where it is designated 7 and whose surface is shaped in conformity with the required correction. The use of such correction lenses is known per se.

In order to loose as little as possible of the light given off by the screen 2 the tube is so arranged that the screen 2 becomes located between the two mirrors but, as shown in Fig. 1, has its edge tangential or substantially tangential to the inner edge of the second mirror. The point of tangency of the mirror and screen edge is designated 8 in Fig. 1. By means of Figs. 2 and 2a it is established why this arrangement is most advantageous.

Figure 2:
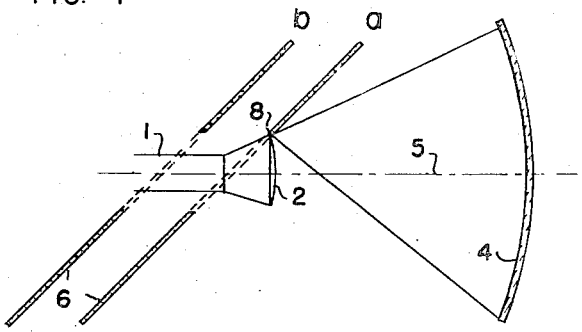
Figure 2A:
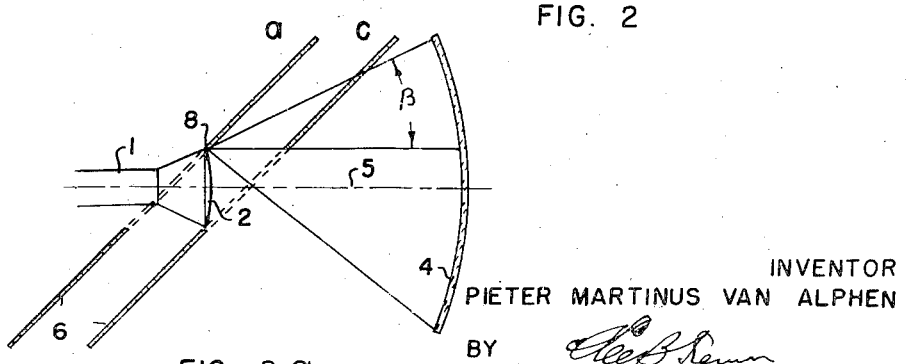

The mirror 6 is shown in Figs. 2 and 2a in three positions a, b, c. In the first two positions a and b as shown in Fig. 2 the image screen 2 is located between the two mirrors 4 and 6. In position a the edge of the screen 2 is tangential in the uppermost point 8 to the surface of the mirror 6. Centrally of the mirror 6 there is a part which has no function due to the fact that there must be an aperture for the tube 1 and that a part of the surface of the mirror 6 lies in the shade of the screen 2.

A portion of the light reflected in any point of the mirror 4 is lost by interception by the fluorescent screen of the tube so that it does not reach the mirror 6. So far as the positions a and b are concerned this portion is substantially identical. A further part becomes lost by interceptions by the remainder of the tube and by those parts of the appliance which are fixed thereto, for example magnet coils, so that it does not reach the mirror. This part is smaller if the mirror is arranged in position a than in position b. Similarly, in position a of the mirror that part of the light which becomes lost by reason of the presence of the aperture in the mirror 6 is smaller. The latter remark does not apply to points of the mirror 4 in relation to which the aperture in the mirror 6 is located entirely in the shadow cone of the screen 2 but it applies to points more distant from the axis 5.

This comparison shows that it is more favourable for the mirror 6 to be arranged in position a than in a position further located to the rear. In addition, in order that the light radiated within the same cone from a point of the mirror 4 may be used in either case the mirror 6 must be possessed of a larger surface in position b than in position a.

If the mirror 6 is arranged in position c as shown in Fig. 2a a new very serious cause of loss of light is set up. It is true that the interception by the screen and so on which occurs in addition to the loss on account of the aperture is obviated but now the loss already occurs with the light that radiates from the screen 2 to the mirror 4. A considerable portion hereof, for the point 8 in the figure the portion that is radiated within the cone designated ρ, is intercepted by the mirror c. If it is decreased by increasing the aperture in the mirror 6 a greater part of the mirror 6 is not used. Position a is therefore not only preferable to position b but also to position c. From the foregoing, it will be seen that in accordance with the invention the mirror 6 is located with respect to the image screen, within a distance bounded by the positions b and c of the mirror and in the following claims the term "immediate vicinity" is to be understood to mean such a location of the mirror relative to the screen.

From the electrical point of view arrangement further to the rear may be desirable if the metal mirror surface and the image screen have a high potential difference when the tube is in use. With cathode-ray tubes for projection purposes use is frequently made of a circuit arrangement such that the screen receives a positive voltage of some thousands of volts relatively to other parts of the tube. Thus, if the mirror surface 6 has the lower potential there is a risk of puncture at the screen 2 in the proximity of the point 8. This risk may be avoided by placing on the mirror a potential which does not differ to any serious extent from the potential the screen 2 receives when the tube is in use. If this means that the mirror cannot be earthed it must be insulated from the casing in which the aggregate is housed but this will generally bring about less difficulty than insulation of the mirror relatively to the screen 2 and at any rate gives this advantage that the mirror can be a direct prolongation of the screen so that the loss of light becomes a minimum.

What I claim is:

1. A projection system comprising a cathode ray tube having a spherical image screen at one end thereof, a first concave real image-producing spherical mirror having its active surface facing said screen and having an optical axis intersecting the central portion of said screen, a second mirror provided with an aperture and arranged at an angle to said optical axis to reflect light rays from said concave mirror to points outside the boundaries of said concave mirror, said cathode ray tube being arranged with the screen in the immediate vicinity of said apertured mirror and substantially all of the light from said image screen being emitted into the space between said first and second mirrors, and a light refractive element positioned in the path of light rays reflected from said second mirror for correcting aberration of said concave mirror.

2. A projection system comprising a cathode ray tube having a spherical image screen at one end thereof, a first concave real image-producing spherical mirror having its active surface facing said screen and having an optical axis intersecting the central portion of said screen, a second plane mirror provided with an aperture and arranged at an angle to said optical axis to reflect light rays from said concave mirror to points outside the boundaries of said concave mirror, said cathode ray tube being arranged with the screen in the immediate vicinity of said apertured mirror and substantially all of the light from said image screen being emitted into the space between said first and second mirrors, and a light refractive element positioned in the path of light rays reflected from said plane mirror for correcting aberrations of said concave mirror.

3. A projection system comprising a cathode ray tube having a spherical image screen at one end thereof, a first concave real image-producing spherical mirror having its active surface facing said screen and having an optical axis intersecting the central portion of said screen, a second mirror provided with an aperture and arranged at an angle to said optical axis to reflect light rays from said concave mirror to points outside the boundaries of said concave mirror, said cathode ray tube being arranged with a portion of the periphery of the screen thereof substantially tangential to the adjacent boundary portion of said aperture nearest said concave mirror, and a light refractive element positioned in the path of the light rays reflected from said second mirror for correcting aberrations of said concave mirror.

4. A projection system comprising a cathode ray tube having a substantially spherical image screen at one end thereof, a first concave real image producing spherical mirror substantially concentric with said screen and having its active surface facing said screen and having an optical axis intersecting said screen at the central portion thereof, a second plane mirror provided with an aperture and arranged at an angle of about 45° with respect to said optical axis to reflect light rays from said concave mirror to points outside the boundaries of said concave mirror, said cathode ray tube being arranged with a portion of the periphery of the screen thereof substantially tangential to the adjacent boundary portion of said aperture nearest said concave mirror, and a light refractive element positioned in the path of the light rays reflected from said plane mirror for correcting aberrations of said concave mirror.

PIETER MARTINUS van ALPHEN.

REFERENCES CITED

The following references are of record in the file of this patent:

UNITED STATES PATENTS

| Number | Name | Date |
|---|---|---|
| 1,960,011 | Ives | May 22, 1934 |
| 1,967,892 | Leibing | July 24, 1934 |
| 2,128,632 | Eaton | Aug. 30, 1938 |
| 2,273,801 | Landis | Feb. 17, 1942 |

FOREIGN PATENTS

| Number | Country | Date |
|---|---|---|
| 624,129 | Germany | Dec. 31, 1932 |
| 548,750 | Great Britain | Oct. 22, 1942 |

OTHER REFERENCES

Scientific American, Aug. 1939, pages 118–123.